July 30, 1940.   H. B. RAPP   2,209,312
GROUND WORKING IMPLEMENT
Filed April 2, 1938   2 Sheets-Sheet 1
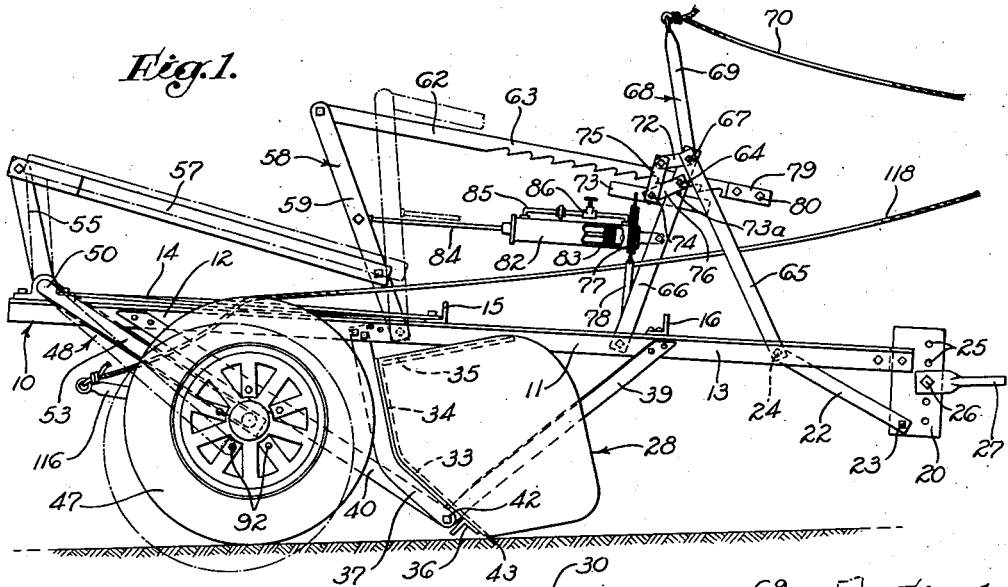
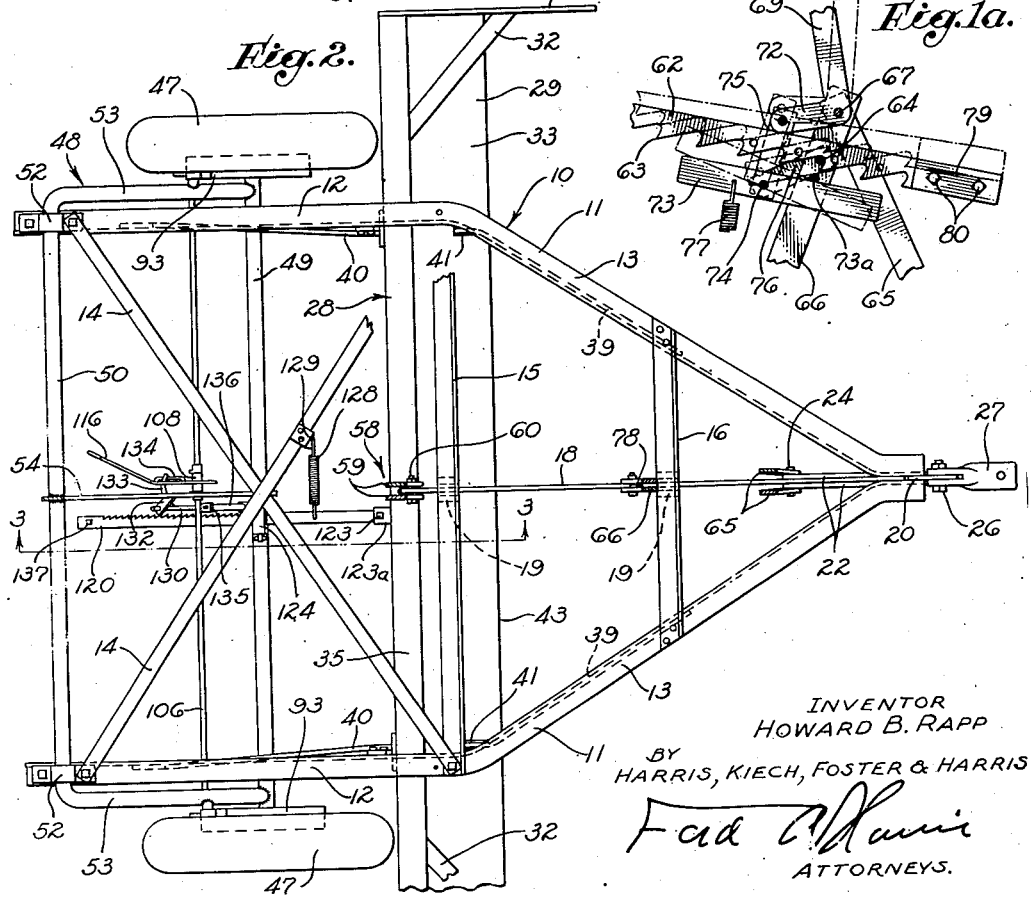
INVENTOR
HOWARD B. RAPP
BY HARRIS, KIECH, FOSTER & HARRIS
ATTORNEYS.

July 30, 1940.  H. B. RAPP  2,209,312
GROUND WORKING IMPLEMENT
Filed April 2, 1938  2 Sheets-Sheet 2
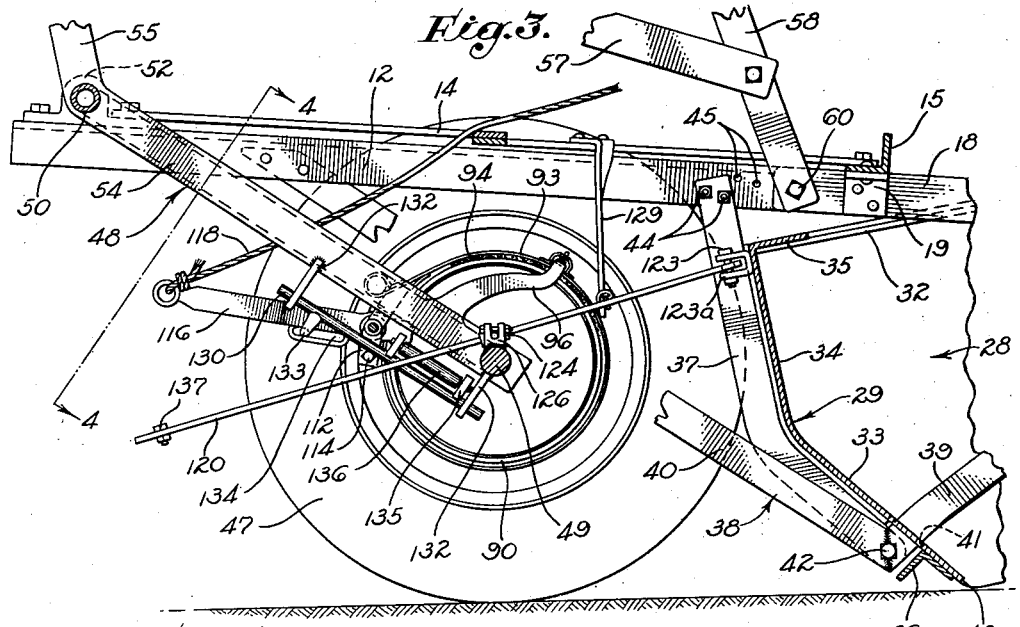
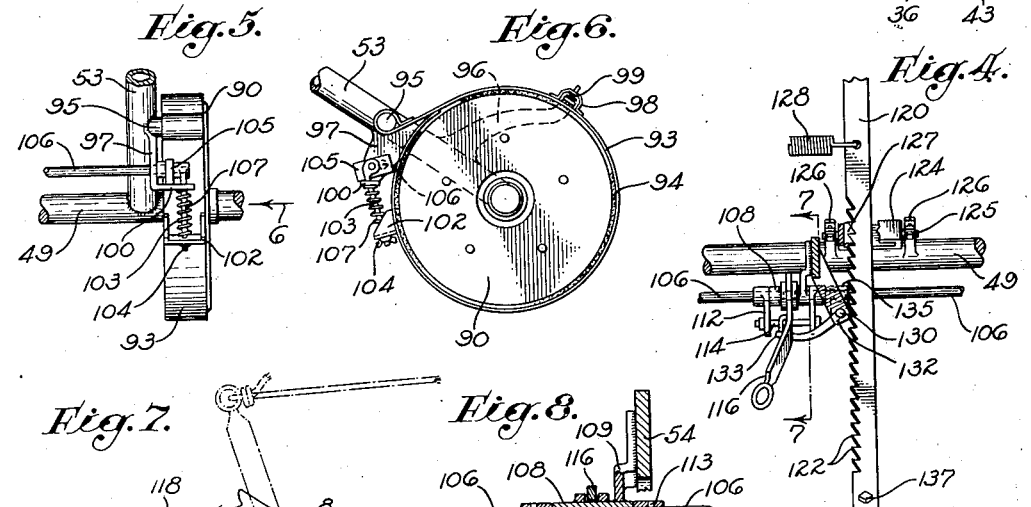
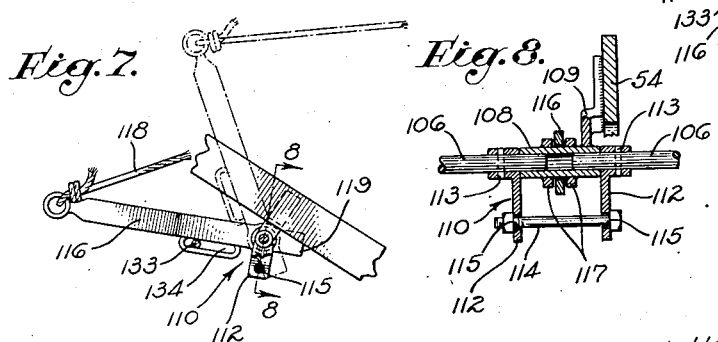
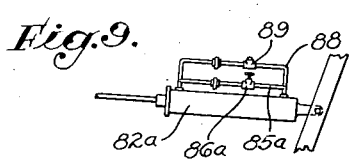
INVENTOR
HOWARD B. RAPP
BY
HARRIS, KIECH, FOSTER & HARRIS
ATTORNEYS.

Patented July 30, 1940

2,209,312

UNITED STATES PATENT OFFICE 2,209,312

GROUND WORKING IMPLEMENT

Howard B. Rapp, Santa Ana, Calif.

Application April 2, 1938, Serial No. 199,642

8 Claims. (Cl. 37—169)

My invention relates to ground-working implements, particularly such implements in which the height of a ground-working tool is varied by means deriving power from ground wheels. My invention is widely applicable to ground-working implements, but lends itself with outstanding advantages to the construction of a land leveler, and the present disclosure will, therefore, be specifically directed to such embodiment as illustrative of the principles involved.

A land leveler of the type commonly drawn by a tractor in road construction and in leveling of land is employed to cut dirt from a ground surface, to move the loosened dirt to a new location, and finally to spread the dirt at a desired thickness. The essential parts of such a leveler comprises a frame, a scraper-bucket carried by the frame, ground wheels supporting the frame, and means controllable by the operator of the tractor to vary the height of the bucket.

In the type of implement to be described herein, the bucket is elevated by raising the whole frame with power derived from the ground wheels, and is subsequently lowered by gravity, a manually-releasable latch being employed to hold the frame at any desired height. It is highly desirable that such a latch act on the principle of a detent in permitting the frame to rise freely with respect to the ground wheels and in automatically latching the frame against any reverse movement. In an implement so organized, the operator merely sets the elevating mechanism in operation for a sufficient interval to bring the frame to the required height and then depends upon the automatic latch to hold the frame at the given adjustment. There is often a tendency, however, especially in hard soil, for the frame to rise from the adjusted position to a new elevation at which it will be held by automatic action of the latch. This difficulty may be avoided, of course, by making the latch positive against forces from both directions, but the desirable detent principle would then be sacrificed.

One of the important objects of my invention is to avoid this difficulty without dropping the detent function on the part of the latch. In attaining the aforementioned object, I have the further object of providing a second latch also acting on the detent principle, but in the opposite direction, so that the two detent latches cooperate to provide a positive lock against movement in either direction of the frame relative to the ground wheels. My invention is characterized by the conception of two such oppositely effective detent means in combination with means for rendering the second detent means ineffective when the frame is being elevated at the will of the operator. A further object of my invention, then, is to provide a normally effective second latch together with means for automatically releasing said second detent means whenever the operator sets in motion the means for elevating the frame.

While my invention may be employed with various frame-elevating means associated with the ground wheels, the particular means selected for this disclosure includes clutch means to resist rotation of the ground wheels. The ground wheels are mounted on a wheel support that is pivoted to the main frame to raise and lower the frame by a swinging action, and the wheel support is so disposed that the clutch action creates a moment tending to rotate the wheel support in a direction to elevate the frame. In accordance with my conception the clutch means and the second latch or detent means mentioned above will be operatively interrelated to the end that said second latch or detent means will be temporarily rendered inoperative whenever the clutch means is actuated. An object of my invention in its preferred form is to interlock the clutch with the second latch by operatively connecting the second latch with the means for controlling the clutch.

The particular braking means employed in the preferred form of my invention includes a clutch drum fixed to a ground wheel, and a clutch band arranged for engaging the clutch drum peripherally. One of the objects of my invention in this preferred form is to arrange for a wrapping action on the part of the clutch band to increase the frictional engagement of the clutch band with the drum. A further object in this aspect of my invention is to provide means spanning the short space between the point at which one end of the clutch band is anchored and the point at which the opposite end of the clutch band is operatively engaged by means for operating the clutch band, the spanning means having the function of protecting the clutches from dirt and other abrasive particles.

It is commonly difficult to control the rate at which the frame in such a combination is raised and lowered, there being a tendency for the clutch means to lift the frame too fast and for the relatively heavy frame to drop too rapidly, the resultant impacts shortening the life of the implement. With such objectionable action in mind, I have the further object, in the preferred form of my invention, of providing adjustable means for automatically regulating these movements of the frame.

In a land leveler, the leading edge of the bucket functions as a cutting tool acting on the soil. For effective operation it is desirable that the angle of this blade be adjustable in acordance with the hardness of the soil. Accordingly, a still further object of my invention is to provide an adjustable tiltable bucket to vary the blade angle, a feature of my invention being that the bucket is mounted for adjustment about a relatively low axis whereby a turning moment about that axis in the soil-cutting operation is minimized.

The above and other features of my invention will be apparent in the detailed description to follow, considered with the accompanying drawings.

In the drawings:

Fig. 1 is a side elevation of my leveler.

Fig. 1a is a vertical section through the forward latch mechanism of Fig. 1.

Fig. 2 is a plan view of the leveler.

Fig. 3 is a vertical longitudinal section taken as indicated by the line 3—3 of Fig. 2.

Fig. 4 is a fragmentary section taken along the plane indicated by the line 4—4 of Fig. 3.

Fig. 5 is a fragmentary view taken from the rear showing one of the brakes employed in my construction.

Fig. 6 is a side view of the brake mechanism taken as indicated by the arrow 6 of Fig. 5.

Fig. 7 is a fragmentary section taken as indicated by the broken line 7—7 of Fig. 4.

Fig. 8 is a section of Fig. 7 taken as indicated by the line 8—8.

Fig. 9 is a side elevation of an alternative form of dashpot that may be employed in my invention.

The main frame designated in its entirety by the numeral 10 includes two side members 11, which may be of angle-iron, the side members having rearward parallel portions 12 and forward converging portions 13. These side members are interconnected by diagonal braces 14 and cross members 15 and 16. Centrally of the frame 10 a longitudinal bar 18 is suitably attached to the bottom faces of the cross members 15 and 16, as by angle-iron clips 19. The forward ends of the side members 11 are connected to opposite sides of the longitudinal bar 18 and to opposite sides of a forward draft plate 20.

The draft plate 20 is braced by a pair of diagonal straps 22 connected at their lower ends to the draft plate by a bolt 23 and connected at their upper ends to the longitudinal bar 18 by a second bolt 24. The draft plate may be provided with a series of vertically spaced holes 25 to receive a bolt 26 for connecting a draft bar 27 to the main frame at selected levels.

The bucket designated in its entirety by the numeral 28 has a body plate 29 and two forwardly extending side plates 30 braced by diagonal members 32. The body plate is bent to the configuration shown in the drawings, thereby providing a lower inclined portion 33, an upper back portion 34, and a top forwardly extending flange 35. The lower inclined portion 33 that serves as a scraper blade for removing soil is reinforced on its underside by suitable means such as an angle 36. Attached to the rearward faces of the body plate 29 is a pair of back members 37 that both reinforce and support the bucket.

At the opposite sides of the leveler frame are downwardly extending brackets generally designated by the numeral 38 that serve to support the bucket 28, each bracket comprising a forward diagonal 39 and a rearward diagonal 40. The two forward diagonals 39 extend through complementary slots 41 in the body plate 29 of the bucket, as shown in Fig. 2. The two back members 37 are pivotally connected to the brackets 38 by suitable bolts 42, so that the bucket may be tilted forward or rearward about an axis determined by the two bolts. It will be noted that this axis is relatively low to minimize the tendency of the bucket to be rotated forward when the leading edge 43 of the bucket bites into the soil.

It is contemplated that the bucket 28 will be adjustable to tilt to various angles. For this purpose the back members 37 may extend above the bucket and be adapted for releasable connection with the main frame of the leveler at various angles. For example, the upper end of each back member 37 may be connected to the corresponding side frame member 11 by a pair of bolts 44, there being holes 45 in the frame member for attachment of the members 37 at various angles.

To provide for raising and lowering the main frame 10, a pair of supporting ground wheels 47 are carried by a wheel support generally designated by the numeral 48, the wheel support being pivotally connected to the main frame 10. Such a wheel support may comprise a transverse axle 49 and a yoke 50, the yoke being journaled in a pair of bearings 52 on the rear of the main frame 10 and two arms 53 of the yoke being terminally connected to the axle 49 on opposite sides of the main frame. The wheel support also includes a central longitudinally disposed bar 54 interconnecting the axle 49 and the yoke 50, the bar extending upwardly above the yoke to provide an arm 55. It will be apparent that the arm 55 and the two arms 53 of the yoke comprise, in effect, a bell-crank having its axis in the two bearings 52. If the yoke 50 is rotated in bearings 52 to raise the main frame and thereby the bucket 28, the upwardly extending arm 55 will be rotated forward from the full line position to the dotted line position of Fig. 1 and vice versa.

The upper end of the arm 55 is connected by a link 57 to a lever 58, the lever 58 comprising a pair of parallel bars 59 pivotally connected to the longitudinal bar 18 by a suitable bolt 60. Pivotally connected to the top of the lever 58 is a forwardly extending bar 62 having a plurality of rearwardly pointing teeth 63 formed in its lower edge and adapted to engage suitable means such as a bolt 64 to latch the main frame 11 at an elevated position attained by rotation of the yoke 50. It will be apparent that the latch provided by this arrangement will function on the detent principle, since it will normally permit the toothed bar 62 to slide forward but will prevent rearward movement of the bar.

The bolt 64 is mounted in a latch bracket comprising a forward pair of legs 65 and a rearward pair of legs 66, each pair of legs being bolted at their bottom ends to the longitudinal bar 18 and being interconnected at their upper ends by a common bolt 67. The toothed bar 62 is confined laterally by the legs 65 and 66 and is restricted above and below by the bolts 67 and 64 respectively.

The manually-operable means for releasing the toothed bar 62 from engagement with the bolt 64 may comprise a bell-crank 68 pivoted on the bolt 67, the bell-crank having an upper arm 69 controlled by a rope 70 and a lower arm 72. Below the toothed bar 62 and extending between each of the pairs of legs 65 and 66 is a release bar 73 provided with a laterally disposed bolt 74. The release bar 73 is connected with the arm 72 of the bell-crank by a pair of links 75 engaging the bolt 74 and is likewise connected with the bolt 64 by a pair of links 76 also engaging the bolt 74. Rearwardly from the bolt 74 the release bar 73 is connected to a spring 77, the spring being anchored at its lower end by a strap 78 connected to the longitudinal bar 18.

By virtue of the spring 77, the rearward end of the release bar 73 is normally spaced below the toothed bar 62, the forward end of the release bar pressing upward against a bolt 73a, but whenever the operator pulls on the rope 70, thereby swinging the bell-crank arm 69 forward, the release bar is rotated upward to lift the toothed bar 62 out of engagement with the bolt 64. When the toothed bar is so released, the main frame 11 gravitates downwardly, causing the toothed bar 62 to move rearwardly, the teeth of the bar riding over the release bar 73. To limit this rearward movement of the toothed bar 62 and thereby the lowering of the main frame 11, the toothed bar may be provided with a pair of stop plates 79 secured to opposite sides thereof by bolts 80. Preferably, there will be a series of holes in the toothed bar spaced to receive the bolts 80 whereby the stop plates 79 may be adjusted at various positions along the toothed bar.

The means in the preferred form of my invention, for regulating the rate of movement of the frame 11 upwardly and downwardly with respect to the ground wheels 47, may comprise a dashpot, for example, a hydraulic cylinder 82 attached to the legs 66 of the latch bracket, the cylinder containing a piston 83 connected to the leveler 58 by a piston rod 84. The opposite ends of the cylinder are interconnected by a small pipe 85, the pipe being provided with an ordinary manually adjustable valve 86. The cylinder is filled with oil or other suitable liquid which is forced from one end of the cylinder to the other through the pipe 85 when the piston is shifted. The adjustment of the valve 86 determines the rate at which liquid is permitted to flow from one end of the cylinder to the other and thereby determines the rate at which the piston is permitted to move. This arrangement will limit the movement of the frame with respect to the wheels to approximately the same rate in both directions.

In another form of my invention I employ an alternative dashpot arrangement that provides for different rates of movement in the two opposite directions. This second dashpot, as shown in Fig. 9, has a pipe 85a interconnecting the two ends of the cylinder 82a and controlled by a valve 86a as before, and is additionally provided with a by-pass pipe 88 in parallel with the pipe 85a, the by-pass pipe being provided with a suitable check valve 89. It will be apparent that flow in one direction will be limited to the passage provided through the valve 86a but in the opposite direction will have the additional freedom provided by the check valve 89.

The clutch means for resisting the rotation of the ground wheels 47 to cause the wheel support 48 to rotate includes a clutch drum 90 secured to each of the ground wheels 47 by bolts 92. Extending around the periphery of each clutch drum is a clutch band 93 having a suitable lining 94. For support of the two clutch bands, each of the arms 53 of the yoke 50 is provided with three arms 95, 96, and 97. One end of the clutch band is secured to the arm 95 and the clutch band is yieldingly supported at an intermediate point by a suitable means at the end of the arm 96, such means including a conventional band clip 98 and spring 99.

The third arm 97 extends vertically downward from the yoke arm 53 and terminates in a laterally extending portion 100. The movable end of the clutch band is provided with an integral bracket 102 apertured to receive an operating link 103, the relationship between the bracket and the link being adjustable by virtue of a wing nut 104 on the lower end of the link. The operating link 103 extends upward through a suitable aperture in the portion 100 of the arm 97 and is pivotally connected to a rocker arm 105 that is keyed to the outer end of a clutch rod 106, there being separate clutch rods for the two wheels. In the usual manner a suitable spring 107 embracing the operating link 103 will tend to hold the clutch band in its normal ineffective disposition.

One feature of the preferred form of my invention is that the clutch band is extended upwardly from the bracket 102 to provide means for covering the clutch drum between the operating end of the clutch drum and the fixed end to prevent dirt, sand, or other foreign material from being deposited on the periphery of the clutch drum at this gap. Another feature of my invention is that the clutch band is disposed to favor a wrapping action that tends to increase the frictional engagement of the clutch band with the clutch drum. This wrapping action is favored by the fact that the band is supported from above at a point no more than 90° from the fixed end of the clutch band so that most of the band is free at all times for frictional contact with the drum, and the wrapping action is further encouraged by the fact that the clutch band substantially encircles the drum in the direction of drum rotation with the free end of the clutch band extending upwardly under the fixed end of the band.

The outer ends of each of the clutch rods 106 are journaled in the arms 97 and the inner ends are journaled in a common sleeve 108, as best shown in Fig. 8, this sleeve being non-rotatably attached to the bar 54 of the wheel support by a suitable bracket member 109. The two clutch rods 106 are interconnected and operated through the medium of an equalizing bracket generally designated by numeral 110. This bracket comprises two rocker arms 112 keyed respectively to the clutch rods 106 by suitable pins 113 and a bolt 114 interconnecting the ends of the two rocker arms. The apertures 115 in the two arms engaged by the bolt 114 will be relatively large to permit the bolt to cant as required for equalizing action.

A lever 116 for operating the two clutches is rotatably mounted on the sleeve 108, being retained thereon by two rings 117 (Fig. 8). Attached to the outer end of the clutch lever 116 is a suitable rope 118 by means of which the lever may be pulled forward from the full line position of Fig. 7 to the dotted line position, such forward motion causing the lower end 119 of the clutch lever to move against the bolt 114 of the equalizing means, thereby causing the two clutch rods 106 to be rotated in clutch-actuating direction. This application of the clutch will tend to cause the wheel supports 48 to rotate forward and upward about the axis of the axle 49.

The second latch or detent means heretofore mentioned that has the function of preventing upward rotation of the wheel support when the clutches are inoperative may be provided by the construction shown in Figs. 2, 3, and 4. An inclined bar 120 having forwardly pointing teeth 122 in one edge is pivotally connected by a bolt 123 at its forward end to a bracket 123a attached to the bucket 28. The bar 120 extends rearward through a pivoted guide yoke 124, the yoke having trunnions 125 journaled in a pair of brackets 126 integral with the axle 49. A dog or detent member 127 is seated in one side of the guide yoke 124 in a position to engage the teeth 122 to prevent the rearward movement of the guide yoke relative to the bar 120. Normal engagement of the detent member 127 with the teeth of the bar is insured by a spring 128 tending to pull the bar laterally into such engagement, the spring being anchored to an arm 129 extending downwardly from one end of the diagonal 14.

This second latch or detent means may be released by any manually-controlled arrangement, but, as previously stated, I prefer to provide a releasing mechanism interlocked with the clutch-actuating mechanism, or operatively connected with such clutch-actuating mechanism, whereby application of the clutches will automatically cause the latch to be released. An arrangement suggested for this purpose includes a release rocker operatively associated with the clutch lever 116.

This rocker includes a rock shaft 130 journaled in a pair of brackets 132 integral with the bar 54 of the wheel support. Extending laterally from the shaft 130 is a curved finger 133 that slidingly engages a slot 134 provided along the edge of the clutch lever 116. Mounted radially on the rock shaft 130 is a pair of brackets 135 in which is journaled a release roller 136, the angular disposition of the two brackets 135 with respect to the finger 133 being such that upward movement of the clutch lever 116 rotating the shaft 130 through the medium of the finger 133 will swing the release roller 136 against the bar 120, thereby causing the bar to be shifted laterally out of engagement with the detent member 127, the wheel support then being free to rotate in a frame-raising direction. The bar 120 may be provided with suitable means such as a bolt 137 near the rear end to serve as a stop whenever there is any tendency for the bar to slide out of the guide yoke 124. Preferably, but not necessarily, the relation of this latch-releasing means and the clutch-actuating means will be such that the latch is released slightly in advance of effective actuation of the clutches, which arrangement will result in the latch becoming effective immediately after the clutches are released.

The operation of my leveler will be understood from the above description. To lower the bucket 28 into an operative position for cutting into the ground, the operator merely pulls on the rope 70 to release the bar 62 for rearward movement, whereupon the main frame will gravitate downward, the yoke 50 rotating to permit such downward movement. When the bucket is lowered to the required level, the operator merely releases the rope 70 to permit the bar 62 to engage the bolt 64, whereupon the downward movement of the frame will cease. If the bucket is to be dropped to a given predetermined level for an extended period of operation, the two stop plates 79 may be adjusted to limit the downward movement of the frame at the required level. With such an adjustment the operator need not observe the depth to which the bucket is dropped, but merely pulls on the rope 70 for a sufficient period of time to bring the stop plates against the two legs 65 of the latch mechanism.

To elevate the main frame and thereby the bucket, the operator pulls on the rope 118 to apply the clutches associated with the two ground wheels 47. The engagement of the clutches creates a moment to rotate the wheel support in a direction to raise the main frame, which rotation causes the notched bar 62 to slide forward over the bolt 64. When the required elevation is attained for spreading dirt to a desired depth, the operator merely releases the clutches and the automatic latching of the bar 62 holds the frame at whatever height the frame has attained under the action of the clutches. The second latch or detent mechanism under the frame prevents the yoke from rotating in a frame-raising direction when the bucket is working against the resistance of relatively hard soil, but this second latch mechanism, because of its operative relationship with the clutch-actuating mechanism, does not interfere with elevation of the main frame at the operator's will.

I have described the preferred form of my invention as applied to land levelers in specific detail for the purpose of adequate disclosure and to illustrate the principles involved. The form described will suggest to those skilled in the art various changes, modifications, and substitutions that do not depart from the spirit of my conception. I reserve the right to all such changes and modifications that properly come within the scope of my appended claims.

I claim as my invention:

1. In an implement of the class described, the combination of: a frame; a ground-working tool carried by the frame; a wheel support pivoted to the frame for rotation to raise and lower the frame; ground wheels mounted on said wheel support; manually-controlled means deriving power from said ground wheels to rotate said wheel support in the direction to raise said frame; manually-releasable detent means to prevent said wheel support from rotating in the direction to lower the frame but to permit said wheel support to rotate in the opposite direction; and detent means to prevent said wheel support from rotating in the direction to raise the frame, said last-named detent means being operatively connected with said manually-controlled means for raising the frame and being adapted to be released automatically whenever said manually-controlled means is actuated, said two detent means being adapted to be effective simultaneously to cooperate with each other to lock said wheel support relative to said frame at various positions of the wheel support.

2. In an implement of the class described, the combination of: a frame; a ground-working tool carried by the frame; a wheel support pivoted to the frame for rotation to raise and lower the frame; ground wheels mounted on said wheel support; manually-controlled means deriving power from said ground wheels to rotate said wheel support in the direction to raise said frame; manually releasable latch means to prevent said wheel support from rotating in the direction to lower the frame; and a dashpot to regulate the rate of rotation of said wheel support.

3. In an implement of the class described, the combination of: a frame; a ground-working tool carried by the frame; a wheel support pivoted to the frame for rotation to raise and lower the frame; ground wheels mounted on said wheel support; manually-controlled means deriving power from said ground wheels to rotate said wheel support in the direction to raise said frame; a manually-releasable detent means adapted to be effective at a plurality of positions of the wheel support to prevent said wheel support from rotating in the frame-lowering direction while permitting the wheel support to rotate in the opposite direction; and manually-releasable detent means adapted to be effective simultaneously with said first detent means at at least some of said plurality of positions of the wheel support to prevent said wheel support from rotating in the frame-raising direction while freely permitting the frame to rotate in the opposite direction whereby said two detent means are cooperative with each other to lock said wheel support at selected angles.

4. In an implement of the class described, the combination of: a frame; a ground-working tool carried by the frame; a wheel support pivoted to the frame for rotation to raise and lower the frame; ground wheels mounted on said wheel support; manually-controlled means deriving power from said ground wheels to rotate said wheel support in the direction to raise said frame; detent means adapted to be effective at a plurality of positions of the wheel support to prevent said wheel support from rotating in the frame-lowering direction while permitting the wheel support to rotate in the opposite direction; manually-operable means to make said detent means incperative; and a second detent means adapted to be effective simultaneously with said first detent means at at least some of said plurality of positions of the wheel support to prevent said wheel support from rotating in the frame-raising direction while permitting the wheel support to rotate in the opposite direction whereby said two detent means are adapted to cooperate to releasably lock said wheel support at selected angles relative to said frame, said second detent means being operatively responsive to said manually-controlled means for rotating the wheel support and being adapted to be rendered ineffective by actuation of said manually-controlled means.

5. In an implement of the class described, the combination of: a frame; a ground-working tool carried by the frame; a wheel support pivoted to the frame for rotation to raise and lower the frame; ground wheels mounted on said wheel support; normally inoperative means to derive power from said ground wheels for rotation of said wheel support in the frame-raising direction; control means for actuating said normally inoperative means for the purpose of raising said frame; normally effective detent means to prevent said wheel support from rotating in the frame-lowering direction; and a normally effective detent means to prevent said wheel support from rotating in the frame-raising direction, said last-named detent means being operatively connected with said control means to be temporarily released thereby when said normally inoperative means is actuated to raise the frame, said two detent means being adapted to be effective simultaneously to cooperate with each other to lock said wheel support at selected angles relative to said frame at various positions of the wheel support.

6. In an implement of the class described, the combination of: a frame; a ground-working tool carried by the frame; a wheel support pivoted to the frame for rotation to raise and lower the frame; ground wheels mounted on said wheel support; manually-controlled means deriving power from said ground wheels to rotate said wheel support in a direction to raise said frame against gravity; manually-releasable latch means to prevent said wheel support from rotating under gravitational movement of the frame; and retarding means to regulate gravitational movement of said frame.

7. In an implement of the class described, the combination of: a frame; a ground-working tool carried by the frame; a wheel support pivoted to the frame for rotation to raise and lower the frame; ground wheels mounted on said wheel support; frictional clutch means on said wheel support to derive power from rotation of said ground wheels, thereby to cause rotation of said wheel support in the frame-raising direction; detent means to prevent rotation of said wheel support in the frame-raising direction but to permit rotation of the wheel support in the opposite direction; control means for said clutch means and said detent means, said control means being manually movable between a normal position with the detent means engaged and the clutch means disengaged and a position to release said detent means and to engage said clutch means; and manually-releasable detent means to prevent said wheel support from rotating in the frame-lowering direction, said last-named detent means being adapted to permit the wheel support to rotate in the frame-raising direction, said two detent means being adapted to be effective simultaneously to cooperate with each other to lock said wheel support at selected angles relative to said frame at various positions of the wheel support.

8. In an implement of the class described, the combination of: à frame; a ground-working tool carried by the frame; a wheel support pivoted to the frame; ground wheels mounted on said wheel support; frictional clutch means for at least one of said ground wheels; manually-operable means to engage said clutch means, thereby to cause said wheel support to rotate in a direction to raise said frame; manually-releasable detent means to prevent rotation of the wheel support in the frame-lowering direction but to permit rotation of the wheel support in the frame-raising direction; detent means to prevent said wheel support from rotating in the frame-raising direction but to permit the wheel support to rotate in the frame-lowering direction, said last-named detent means being operatively connected with said manually-operable means for the clutch, whereby the last-named detent means is released when said clutch is engaged; and yielding means to hold said last-named detent means in normal effective disposition, said two detent means being adapted to be effective simultaneously to cooperate with each other to lock said wheel support at selected angles relative to said frame at various positions of the wheel support.

HOWARD B. RAPP.